(12) United States Patent
Aloui Dalibey et al.

(10) Patent No.: US 11,993,705 B2
(45) Date of Patent: May 28, 2024

(54) HIGH PLA CONTENT PLASTIC MATERIAL COMPRISING A CITRATE ESTER

(71) Applicant: CARBIOLICE, Riom (FR)

(72) Inventors: Madiha Aloui Dalibey, Clermont-Ferrand (FR); Clementine Arnault, Clermont-Ferrand (FR)

(73) Assignee: CARBIOLICE, Riom (FR)

( * ) Notice: Subject to any disclaimer, the term of this patent is extended or adjusted under 35 U.S.C. 154(b) by 118 days.

(21) Appl. No.: 17/258,116

(22) PCT Filed: Jul. 5, 2019

(86) PCT No.: PCT/EP2019/068095
§ 371 (c)(1),
(2) Date: Jan. 5, 2021

(87) PCT Pub. No.: WO2020/008029
PCT Pub. Date: Jan. 9, 2020

(65) Prior Publication Data
US 2021/0284836 A1    Sep. 16, 2021

(30) Foreign Application Priority Data
Jul. 6, 2018   (FR) ...................................... 1870810

(51) Int. Cl.
*C08L 67/04* (2006.01)
*C08K 5/11* (2006.01)
*C08L 33/06* (2006.01)
*C08L 67/02* (2006.01)
*C08L 89/00* (2006.01)
*C08L 33/08* (2006.01)

(52) U.S. Cl.
CPC ................ *C08L 67/02* (2013.01); *C08K 5/11* (2013.01); *C08L 67/04* (2013.01); *C08L 89/00* (2013.01); *C08L 33/068* (2013.01); *C08L 33/08* (2013.01); *C08L 2205/025* (2013.01); *C08L 2205/035* (2013.01); *C08L 2205/08* (2013.01); *C08L 2666/68* (2013.01)

(58) Field of Classification Search
None
See application file for complete search history.

(56) References Cited

U.S. PATENT DOCUMENTS

| | | |
|---|---|---|
| 5,436,078 A | 7/1995 | Buhler et al. |
| 6,841,597 B2 | 1/2005 | Bastioli et al. |
| 7,368,503 B2 | 5/2008 | Hale |
| 7,448,510 B2 | 11/2008 | Pavlos |
| 7,449,510 B2 | 11/2008 | Ueda et al. |
| 9,096,758 B2 | 8/2015 | Loos et al. |
| 2005/0015411 A1 | 1/2005 | Altman |
| 2007/0027247 A1* | 2/2007 | Ueda ..................... C08K 5/1515 524/445 |
| 2012/0232191 A1* | 9/2012 | Auffermann ............... C08J 5/18 524/424 |
| 2014/0232043 A1* | 8/2014 | Coupin ................... C08L 67/00 524/310 |
| 2014/0303278 A1* | 10/2014 | Ferreira ................... C08J 3/201 523/125 |

FOREIGN PATENT DOCUMENTS

| | | | | |
|---|---|---|---|---|
| CN | 105086395 A | * | 11/2015 | |
| CN | 105086395 A | | 11/2015 | |
| CN | 106519618 A | | 3/2017 | |
| CN | 106519618 A | | 8/2018 | |
| CN | 106881929 B | | 3/2019 | |
| EP | 1911807 A1 | * | 4/2008 | ............. C08L 25/12 |
| EP | 2679633 A1 | | 1/2014 | |
| EP | 2258775 B1 | | 9/2015 | |
| EP | 2256149 B1 | | 8/2016 | |
| EP | 1699872 B1 | | 6/2017 | |
| WO | 2002/059198 A1 | | 8/2002 | |
| WO | 2002/059199 A1 | | 8/2002 | |
| WO | 2002/059202 A1 | | 8/2002 | |
| WO | 2004/052646 A1 | | 6/2004 | |
| WO | 2007/118828 A1 | | 10/2007 | |
| WO | 2012/141660 A1 | | 10/2012 | |
| WO | 2013/093355 A1 | | 6/2013 | |
| WO | 2013/164743 A1 | | 11/2013 | |
| WO | 2015/057694 A2 | | 4/2015 | |
| WO | 2016/062695 A1 | | 4/2016 | |
| WO | 2016/146540 A1 | | 9/2016 | |
| WO | 2016/198650 A1 | | 12/2016 | |
| WO | 2016/198652 A1 | | 12/2016 | |
| WO | 2019/043134 A1 | | 3/2019 | |
| WO | 2019/043145 A1 | | 3/2019 | |

OTHER PUBLICATIONS

Dong et al.,"Effect of Chain-Extenders on the Properties and Hydrolytic Degradation Behavior of the Poly(lactide)/Poly(butylene adipate-co-terephthalate) Blends", International Journal of Molecular Sciences, 2013, 14, 20189-20203.
Ojijo et al., Super toughened biodegradable polylactide blends with non-linear copolymer interfacial architecture obtained via facile in-situ reactive compatibilization, Polymer, 2015, 80, 1-17.
International Search Report of PCT/EP/2019/068095, Search completed on Aug. 8, 2019 by Stephane Bezard, 2 pages.

* cited by examiner

*Primary Examiner* — Richard A Huhn
(74) *Attorney, Agent, or Firm* — BCF LLP

(57) ABSTRACT

The present invention relates to a plastic composition based on biodegradable and bio-based polyesters, in particular for the preparation of plastic films.

16 Claims, No Drawings

HIGH PLA CONTENT PLASTIC MATERIAL COMPRISING A CITRATE ESTER

FIELD OF THE INVENTION

The present invention relates to a plastic composition based on biodegradable and bio-based polyesters, in particular for the preparation of plastic films.

STATE OF THE ART

Bio-based and biodegradable films, based on starches or starch derivatives and polyester, in particular monolayer or multilayer films, are known to be used in particular for the manufacture of plastic bags. These bags are used in particular for the packaging of food products, particularly fruit and vegetables.

Particular mention may be made of the films described in patents and patent applications U.S. Pat. Nos. 6,841,597, 5,436,078, WO 2007/118828, WO 2002/059202, WO 2002/059199, WO 2002/059198, U.S. Pat. No. 9,096,758, WO 2004/052646 and CN 106881929. Bio-based and/or biodegradable materials used to maintain the mechanical properties adapted to their use remain expensive.

Increasing the polylactic acid (PLA) content makes it possible to increase the content of less expensive bio-based materials, such as in biodegradable resin compositions (WO 2018/056539). This increase in PLA content usually requires the use of a compatibilizer to allow the PLA to be mixed with another polyester, such as polybutylene adipate terephthalate (PBAT). Such compatibilizers are known for this use, in particular polyacrylates, such as the products marketed under the names Joncryl® ADR (Dong & al., International Journal of Molecular Sciences, 2013, 14, 20189-20203; Ojijo & al., Polymer 2015, 80, 1-17; EP 1 699 872; EP 2 258 775; EP 2 679 633; WO 2013/164743; WO 2015/057694; U.S. Pat. No. 7,448,510; US 2012/232191; U.S. Pat. No. 7,368,503).

However, the increase in PLA content is to the detriment of the mechanical properties of the products prepared with these polymer compositions. Thus, films obtained with such high-PLA-content compositions, despite the addition of compatibilizer, have reduced mechanical properties compared with films with less PLA, particularly in terms of elongation at break and tear resistance. In fact, increasing the PLA content in the compositions of the state of the art does not meet bag manufacturing specifications.

The invention solves this technical problem by adding a particular plasticizer to the mixture of polyesters and compatibilizer.

DISCLOSURE OF THE INVENTION

The invention relates to a plastic composition which comprises
a. at least 20% by weight polylactic acid (PLA),
b. at least 45% by weight of a polyester selected from polybutylene adipate terephthalate (PBAT), polyhydroxyalkanoates (PHAs), polybutylene succinate (PBS), polybutylene succinate adipate (PBSA) and mixtures thereof,
c. a PLA/polyester compatibilizer, and
d. a plasticizer selected from citrate esters.

The invention also relates to a plastic film the composition of which comprises a composition according to the invention, in particular obtained by extrusion of a composition according to the invention.

Finally, the invention relates to a process for preparing a composition according to the invention which comprises at least the successive steps of mixing and melting with
1. the PLA and the compatibilizer, then
2. the polyester selected from polybutylene adipate terephthalate (PBAT), polyhydroxyalkanoates (PHAs), polybutylene succinate (PBS), polybutylene succinate adipate (PBSA) and mixtures thereof,
the plasticizer selected from citrate esters which can be added at any time during the process.

DETAILED DESCRIPTION OF THE INVENTION

The invention relates to a plastic composition which comprises
a. at least 20% by weight polylactic acid (PLA),
b. at least 45% by weight of a polyester selected from polybutylene adipate terephthalate (PBAT), polyhydroxyalkanoates (PHAs), polybutylene succinate (PBS), polybutylene succinate adipate (PBSA) and mixtures thereof
c. a PLA/polyester compatibilizer, and
d. a plasticizer selected from citrate esters.

Unless otherwise specified, percentages are given by weight in relation to the total weight of the composition to which they refer.

The constituents of the composition according to the invention are well known to the person skilled in the art, notably described in the publications, patents and patent applications cited above, in particular the polyesters and PLA commonly used in the biodegradable and/or bio-based plastics industry, in particular for producing bio-based and biodegradable films.

PLA is formed from levorotatory (L) lactic acid monomers and/or dextrorotatory (D) monomers, with the level of (L) and (D) monomers being variable. PLA can be a mixture of levorotatory PLA (PLLA), which is formed from predominantly (L) monomers, and dextrorotatory PLA (PDLA), which is formed from predominantly (D) monomers.

Advantageously, the polyester b) is PBAT. When used in mixture with other polyesters such as PHAs, PBS or PBSA, PBAT is in majority proportion in the mixture of polyesters other than PLA, preferably more than 60% of the mixture, more preferentially more than 70% even more preferentially more than 80% by weight. According to a particular and preferred embodiment of the invention, the polyester b) other than PLA is essentially PBAT, more preferentially consists only of PBAT.

PLA/polyester compatibilizers are well known to the skilled person, in particular selected from polyacrylates, terpolymers of ethylene, acrylic ester and glycidyl methacrylate (for example, marketed under the brand name Lotader® by the firm Arkema), PLA-PBAT-PLA triblock copolymers, maleic anhydride-grafted PLA (PLA-g-MA) or maleic anhydride-grafted PBAT (PBAT-g-MA).

According to a preferred embodiment of the invention, the compatibilizer is selected from polyacrylates, advantageously selected among methacrylate derivatives, preferentially the compatibilizer is poly(ethylene-co-methyl acrylate-co-glycidyl methacrylate). Such compatibilizers are well known and described in particular by Dong & al. (International Journal of Molecular Sciences, 2013, 14, 20189-20203) and Ojijo & al. (Polymer 2015, 80, 1-17). A preferred compatibilizer is poly(ethylene-co-methyl acrylate-co-glycidyl methacrylate) marketed under the name JONCRYL® ADR-4468—by the firm BASF.

Citrate esters are also plasticizers known to the skilled person, in particular as bio-based materials. These include triethyl citrate (TEC), triethyl acetyl citrate (TEAC), tributyl citrate (TBC), tributyl acetyl citrate (TBAC). Preferentially, the citrate ester used as plasticizer in the composition according to the invention is TBAC.

Preferably, the composition according to the invention comprises at least 25% PLA, more preferentially at least 28% PLA, even more preferentially at least 30% PLA. The combination of the compatibilizer and plasticizer used according to the invention and in particular the selection of citrate esters as plasticizers makes it possible to obtain PLA contents up to at least 35%, and even higher, up to about 50% PLA.

The polyester b) content is advantageously at least 50% of the total weight of the composition. According to an advantageous embodiment of the invention, the polyester b) content is comprised between 60 and 72%.

The compatibilizer c) content in the composition according to the invention is advantageously at least 0.1%, preferably from 0.4 to 2%, in particular 0.4, 0.5, or 1%, more preferentially from 0.4 to 1.5%, advantageously about 0.4% by weight in relation to the total weight of the composition.

The citrate ester plasticizer d) content in the composition according to the invention is advantageously at least 0.5%, preferably from 1 to 5%, more preferentially from 2 to 4%, advantageously about 3%, preferably about 2.5%.

The composition according to the invention may comprise other usual additives used in the composition of plastics materials, in particular for the preparation of films, such as mineral or organic fillers, pigments or dyes, etc. In a particular example, the composition according to the invention may comprise calcium carbonate.

In a particular case, the composition according to the invention comprises in relation to the total weight of the composition
a. at least 25% by weight polylactic acid (PLA), preferentially at least 28%, more preferentially at least 30% PLA,
b. at least 60% by weight of a polyester selected from polybutylene adipate terephthalate (PBAT), polyhydroxyalkanoates (PHAs), polybutylene succinate (PBS), polybutylene succinate adipate (PBSA) and mixtures thereof
c. between 0.4 to 1.5% of a PLA/polyester compatibilizer selected from polyacrylates, and
d. between 2 to 4% of a plasticizer selected from citrate esters.

The composition according to the invention may also comprise enzymes capable of degrading polyesters so as to improve the biodegradability of the film according to the invention. In a particular embodiment, the composition according to the invention may comprise enzymes capable of degrading PLA. Such enzymes and their mode of incorporation in thermoplastic films are known to the skilled person, in particular described in patent applications WO 2013/093355, WO 2016/198652, WO 2016/198650, WO 2016/146540 and WO 2016/062695. Preferentially these enzymes are selected from proteases and serine proteases. In a particular embodiment, the serine proteases are selected from proteinase K from *Tritirachium album*, or PLA-degrading enzymes derived from *Amycolatopsis* sp., *Actinomadura keratinilytica, Laceyella sacchari* LP175, *Thermus* sp. or *Bacillus licheniformis*, or commercially reformulated enzymes known to degrade PLA such as Savinase®, Esperase®, Everlase® or any enzyme of the subtilisin family CAS 9014-01-1 or any functional variant.

When the composition according to the invention also comprises polyester-degrading enzymes, in particular PLA-degrading enzymes, the enzyme complemented composition is advantageously the following:
From 80% to 98% by weight, preferentially from 90% to 98% by weight, of the previously defined PLA-rich composition, and
From 2 to 20%, preferentially from 2% to 10%, of an enzyme composition comprising from 0.0005 to 10% of enzyme associated with 50 to 95% of a low-melting-point polymer and optionally associated with a stabilizer. This stabilizer may be selected from polysaccharides, preferentially from natural gums such as gum arabic.

Said enzyme composition can be prepared via the extrusion of 50 to 95%, preferentially from 70 to 90%, of a low-melting-point polymer and from 5 to 50%, preferentially from 10 to 30%, of a liquid enzyme formulation comprising from 0.01 to 35% enzymes, from 19 to 60% preferably 19 to 65% water and from 15 to 70% stabilizer.

Such enzyme compositions and/or liquid enzyme formulations suitable for the preparation of PLA-rich polymer mixtures are in particular described in patent applications WO 2019/043145 and WO 2019/043134.

A preferred enzyme composition comprises in particular, from 50 to 95% of a low-melting-point polymer, in particular polycaprolactone (PCL), preferentially from 70 to 90%, from 0.001 to 10% enzymes, preferentially from 0.5 to 6%, or even 1 to 6%, and from 1.5 to 21% gum arabic, preferentially from 3 to 7%.

The complemented enzyme composition according to the invention will advantageously comprise
at least 20% PLA, advantageously at least 25% PLA
at least 40% PBAT
at least 0.08% PLA/PBAT compatibilizer, advantageously at least 0.4%
at least 0.4% plasticizer selected from citrate esters
at least 0.002% enzyme, advantageously at least 0.05%, and
at least 1.4% of a low-melting-point polymer, advantageously at least 1.5%.

The skilled person will know how to adapt the enzyme content, and consequently the content of low-melting-point polymer and other additives brought by the enzyme composition according to his objectives of the rate of degradation of PLA by the enzymes.

The invention also relates to a process for preparing compositions according to the invention, with the compounds described above, with their proportions, comprising the steps of
1. mixing the PLA and the compatibilizer at a temperature where the PLA is partially or completely melted, then
2. adding polyester selected from polybutylene adipate terephthalate (PBAT), polyhydroxyalkanoates (PHAs), polybutylene succinate (PBS), polybutylene succinate adipate (PBSA) and mixtures thereof, at a temperature where the previously obtained mixture is partially or completely melted.

The plasticizer selected from citrate esters can be added at any time during the process: at the time of step 1 with PLA and compatibilizer, between step 1 and step 2, at the time of step 2 with the polyester or after step 2.

In a particular case, the invention relates to a process for preparing a composition according to the invention comprising the steps of
1. mixing at least 25% by weight (in relation to the total weight of the composition of the invention) PLA and between 0.4% and 1.5% by weight compatibilizer at a temperature greater than or equal to 120° C., then 2. adding at least 60% of the polyester selected from polybutylene adipate terephthalate (PBAT), polyhydroxyalkanoates (PHAs), polybutylene succinate (PBS), polybutylene succinate adipate (PBSA) and mixtures thereof, at a temperature where the previously obtained mixture is partially or completely melted, the addition of between 2 to 4% by weight of the plasticizer selected from citrate esters which can be carried out at any time during the process.

The preparation of the composition is done according to the usual methods of the art, in particular by extrusion. The extruded molten mixture is then cooled to form granules then is generally transformed into an end product of particular shape (films, flexible or solid parts).

When the products prepared with the composition according to the invention also comprise polyester-degrading enzymes as defined above, the latter are added either at the time of preparation of the composition or at the time of preparation of the end products by mixing granules of the composition according to the invention, and the enzymes in a form suitable for their incorporation and according to the usual methods known to the skilled person.

To facilitate the incorporation of the enzymes into the composition according to the invention, the latter will be used advantageously in the form of an adapted composition, which allows both the conservation and transport of the enzymes, but also promotes their incorporation by preventing their degradation during this incorporation stage. Such compositions are known to the skilled person, and in particular described in patent applications WO 2019/043145 and WO 2019/043134.

In particular, the addition of enzymes to the composition according to the invention can be advantageously done as follows: mixing between 80% and 98% of a composition according to the invention, with between 2% and 20% of a composition comprising a polyester-degrading enzyme and in particular PLA, the percentages being given by weight in relation to the weight of the final composition.

The invention also relates to any plastic product consisting of or comprising elements of the composition according to the invention.

According to a first embodiment, the composition is in the form of granules prepared according to the usual techniques. These granules can be stored, transported, as granules used in the manufacture of plastic products, whatever their form and use, which can be called "end products". They can be films, or flexible or solid parts with shapes and volumes adapted to their uses.

The methods for preparation of these end products are well known to the skilled person, including in particular the usual techniques of the plastics industry such as blown film extrusion, extrusion-blow molding, cast film extrusion, calendering and thermoforming, injection molding, compression molding, rotomolding, coating, lamination, expansion, pultrusion, compression-granulation. Such operations are well known to the skilled person, who will easily adapt the process conditions to the type of plastic products expected (for example temperature, dwell time, etc.).

The composition according to the invention is particularly suitable for making plastic films. The films according to the invention can be produced according to the usual methods of the art, in particular by extrusion-inflation. The films can be prepared directly at the outlet of the extrusion die used for the preparation of the composition according to the invention, or from granules of the composition according to the invention which are melted according to the usual techniques, in particular by extrusion.

The invention therefore also relates to a film of composition as previously defined, with or without enzymes. The films according to the invention may be monolayer or multilayer films. In the case of a multilayer film, at least one of the layers is of composition as previously defined.

The composition according to the invention is particularly adapted to be associated with polyester-degrading enzymes for the manufacture of biodegradable plastic films.

Plastic films, in particular monolayer films, with a composition as defined above, have both a high PLA content and retain mechanical properties as sought for the preparation of biodegradable and bio-based bags, in particular for packaging, mulching films, and packaging of non-food or food products.

To this end, the constituents of the composition according to the invention will preferentially be selected from products compatible with a food use.

The films according to the invention have advantageously a thickness of less than 100 µm, more advantageously less than 50 µm, 40 µm or 30 µm, preferentially less than 20 µm, in particular from 10 to 20 µm, more preferentially from 6 to 20 µm.

The plastic films obtained with the composition according to the invention advantageously have the following properties,
an elongation at break of greater than 130% longitudinally and more than 240% transversely, measured according to standard EN ISO 527-3, and/or
a tear resistance of greater than 30 N/mm in the transverse direction of the film, measured according to standard EN ISO 6383-1
while having a high PLA content.

The elongation at break of the plastic film obtained with the composition according to the invention is advantageously at least 170%, longitudinally preferably at least 200%.

The tear resistance of the plastic film obtained with the composition according to the invention is advantageously at least 35 N/mm in the transverse direction of the film, preferably at least 40 N/mm, more preferentially at least 45 N/mm.

In a particular embodiment, the plastic films obtained with the composition according to the invention also have the following properties,
1. an elastic modulus greater than 200 MPa longitudinally and greater than 150 MPa transversely, measured according to standard EN ISO 527-3 and/or
2. a maximum stress greater than 15 MPa longitudinally and greater than 13 MPa transversely, measured according to standard EN ISO 527-3.

The composition according to the invention can also be used for the production of rigid plastic products such as food packaging.

EXAMPLES

Example 1

A) Production of the Compositions

The compositions were produced on a Leistritz ZSE 18MAXX twin-screw co-rotating extruder. Solids such as the polymers and the compatibilizer were introduced using one or two gravimetric feeders depending on the composition. Indeed, for the compositions containing the compatibilizer Joncryl® ADR 4468 C, the PLA and compatibilizer mixture was first introduced at the beginning of the extruder via a first dosing device, then the PBAT was introduced in a delayed manner via a second dosing device. For the compositions without compatibilizer, PLA (4043D) and PBAT (Ecoflex® C1200) were mixed then introduced with a dosing device at the beginning of the extrusion. TBAC (Citrofol® BII) was introduced with a Brabender liquid pump at the beginning of the extrusion. CaCO3 was introduced with a gravimetric dosing device in zone 7/10.

All compositions were prepared under the same process conditions with a screw speed of 70 rpm and at a throughput of 2 to 4 kg/hour.

The parameters used for the extrusion of the compositions are presented in Table 1.

TABLE 1

| | Zone | | | | | | | | | |
|---|---|---|---|---|---|---|---|---|---|---|
| | Z1 | Z2 | Z3 | Z4 | Z5 | Z6 | Z7 | Z8 | Z9 | Nozzle |
| Temperature (° C.) | 190 | 190 | 190 | 185 | 185 | 185 | 185 | 180 | 180 | 180 |

The mixture of the components arrives in a molten state in the last zone of the twin-screw extruder which has a die with a 3.5 mm diameter hole and is immediately immersed in a 2 m water tank and fed to a granulator to obtain cylindrical granules with a diameter of less than 3 mm.

The granules obtained have the compositions described in Table 2 (% by weight in relation to the total weight of the composition)

TABLE 2

| | PLA | PBAT | TBAC | Joncryl ® ADR 4468 C | CaCO$_3$ |
|---|---|---|---|---|---|
| 1 | 30 | 69 | | 1 | |
| 2 | 30 | 67 | 3 | | |
| 3 | 30 | 66 | 3 | 1 | |
| 4 | 20 | 76 | 3 | 1 | |
| 5 | 25 | 71 | 3 | 1 | |
| 6 | 20 | 73 | 3 | 1 | 3 |
| 7 | 25 | 68 | 3 | 1 | 3 |

B) Production of Films with the Compositions Described in A)

The compositions 1 to 6 prepared in A) were used for the preparation of films. For the extrusion-blow molding, a LabTech LF-250 laboratory line, width 20 mm, 30 L/D screw type LBE20-30/C was used. Before the extrusion-blow molding the compositions were dried in a desiccator 4 h at 80° C. The screw speed was 60 rpm. The inflation rate was about 5.

The settings for the extrusion-blow molding temperatures are detailed in Table 3.

TABLE 3

| | Zone | | | | | |
|---|---|---|---|---|---|---|
| | Z1 | Z2 | Z3 | Z4 | Line #1 | Line #2 |
| T° C. | 150 | 150 | 150 | 150 | 155 | 155 |

The average thicknesses of the produced films measured with a micrometer are given in Table 4.

TABLE 4

| Granules | Film | Thickness (μm) |
|---|---|---|
| Composition 1 | Film 1 | 15 |
| Composition 2 | Film 2 | 14 |
| Composition 3 | Film 3 | 15 |
| Composition 4 | Film 4 | 16 |
| Composition 5 | Film 5 | 17 |
| Composition 6 | Film 6 | 17 |
| Composition 7 | Film 7 | 17 |

C) Characterization of the Mechanical Properties in Single Tension and in Tearing The films were then mechanically characterized in single tension and in tearing using a Zwick testing machine equipped with a 50 N sensor. The experimental conditions per test type are summarized in Table 5.

A "pants" type test tube is used for the tear test.

Two important criteria in the application area of bag manufacture are elongation at break and tear resistance. Tearing is characterized only in the transverse direction of the film.

TABLE 5

| Test | Sample dimensions (mm*mm) | Distance between jaws (mm) | Crosshead speed (mm/min) |
|---|---|---|---|
| Single tension | 15*150 | 80 | 100 |
| Tearing | 50*150 | 75 | 120 |

The results obtained for Films 1 to 6 are given in Table 6 (MD=Longitudinal Direction; TD=Transverse Direction).

TABLE 6

| Film | Test direction | Elongation at break (%) | Tear resistance (N/mm) |
|---|---|---|---|
| Film 1 | MD | 140 | — |
| | TD | 200 | 38.6 |
| Film 2 | MD | 120 | — |
| | TD | 180 | 9.3 |
| Film 3 | MD | 190 | — |
| | TD | 290 | 41.4 |
| Film 4 | MD | 270 | — |
| | TD | 380 | 67.5 |
| Film 5 | MD | 250 | — |
| | TD | 300 | 48.6 |
| Film 6 | MD | 220 | — |
| | TD | 360 | 54.6 |
| Film 7 | MD | 220 | — |
| | TD | 300 | 45.7 |

The inventors have established a set of specifications to be reached allowing the sale of the films of the invention in the bagging market, namely that it is desirable that the films of the invention reach the following values:

Elongation at break, which measures the ability of a material to elongate under load before breaking: 130% longitudinally and 240% transversely measured according to standard EN ISO 527-3.

Tear resistance: 40 N/mm transversely and measured according to the conditions of standard DIN EN ISO 6383 at 200 mm/min or under the conditions as described in this example.

By comparing the properties of Films 1, 2 and 3, it can be observed that the composition described in the invention makes it possible to achieve the properties of the set of specifications. Indeed, the presence of the compatibilizer Joncryl® (Film 1) or the plasticizer TBAC (Film 2) alone does not allow it.

The comparison of Film 4 (20% PLA), with Film 5 (25% PLA) and with Film 3 (30% PLA) shows that the decrease in PLA content improves the discriminating properties of the film. Hence the interest of the invention to increase the PLA content in films while maintaining the properties of the set of specifications.

By comparing Films 6 and 7 with Films 4 and 5 respectively, it is shown that the addition of CaCO3 fillers leads to a slight decrease in elongation properties while remaining within the set of specifications.

The films of the invention must also meet criteria of elastic modulus and maximum stress. The elastic modulus and maximum stress characteristics of the films are given in Table 7.

TABLE 7

| Film | Test direction | Elastic modulus (MPa) | Maximum stress (MPa) |
| --- | --- | --- | --- |
| Film 1 | MD | 489 | 28.4 |
|  | TD | 267 | 13.5 |
| Film 2 | MD | 968 | 28.6 |
|  | TD | 301 | 12.7 |
| Film 3 | MD | 343 | 22.8 |
|  | TD | 195 | 15.6 |
| Film 4 | MD | 238 | 27.1 |
|  | TD | 166 | 24.4 |
| Film 5 | MD | 358 | 30.2 |
|  | TD | 192 | 18.0 |
| Film 6 | MD | 267 | 26.1 |
|  | TD | 174 | 21.6 |
| Film 7 | MD | 396 | 29.2 |
|  | TD | 214 | 17.8 |

The specifications established by the inventors and adapted to the bagging market require that the films reach the following values:

Elastic modulus: 200 MPa longitudinally and 150 MPa transversely

Maximum stress: 15 MPa longitudinally and 13 MPa transversely

All the films resulting from the invention have properties of elastic modulus and maximum stress not deteriorated in comparison with films of the state of the art, and corresponding to the values required by the specifications defined above.

Example 2

A) Production of the Composition

The granules were produced on a twin-screw co-rotating Clextral Evolum 25 HT. To introduce the polymers (PLA 4043D and PBAT Ecoflex® C1200) and the compatibilizer, two gravimetric dosing devices were used and to dose the liquid TBAC, a PCM pump was used.

The PLA and Joncryl® mixture was introduced via a dosing device at the beginning of the screw in the presence of the plasticizer TBAC. The mixture is melted and fed into the PBAT introduction zone.

The granules were prepared with an auger speed of 500 rpm and a throughput of 40 kg/h.

The parameters used for the extrusion of the granules are shown in Table 8.

TABLE 8

| | Zone | | | | | | | | | | | |
| --- | --- | --- | --- | --- | --- | --- | --- | --- | --- | --- | --- | --- |
| | Z1 | Z2 | Z3 | Z4 | Z5 | Z6 | Z7 | Z8 | Z9 | Z10 | Z11 | Z12 |
| Temperature | 40 | 190 | 190 | 190 | 190 | 190 | 190 | 190 | 190 | 190 | 190 | 190 |

The mixture of the components arrives in the melted state in the screw in Z12 and is immediately immersed in a 2.5 m water tank and fed to a granulator to obtain cylindrical granules with a diameter of less than 3 mm.

Three compositions are prepared, a composition 8 corresponding to the state of the art comprising 30% PLA and 70% PBAT, a composition 9 according to the invention comprising 30% PLA, 66% PBAT, 3% TBAC and 1% Joncryl® ADR 4468 C, and a composition 10 according to the invention comprising 35% PLA, 60.3% PBAT, 3.5% TBAC and 1.2% Joncryl® ADR 4468 C (% by weight in relation to the total weight of the composition).

B) Production of the Film with the Compositions Described in A)

The granules prepared as described in A) were used for extrusion-blow molding with the same process and parameters described in Example 1 part B).

The film 8 of composition 8 has an average thickness of 10 μm. The films 9 and 10 of composition 9 and 10 have an average thickness of 14 μm. The thicknesses were measured with a micrometer.

C) Characterization of the Mechanical Properties in Single Tension and in Tearing The films were then characterized mechanically in single tension and in tearing using a Lloyd LS5 testing machine equipped with a 20 N sensor and using standards EN ISO 527-3 and EN ISO 6383-1, respectively. The experimental conditions by type of test are summarized in Table 9.

A "pants" type test tube is used for the tear test.

TABLE 9

| Test | Sample dimensions (mm*mm) | Distance between jaws (mm) | Crosshead speed (mm/min) |
| --- | --- | --- | --- |
| Single tension | 15*150 | 80 | 100 |
| Tearing | 50*150 | 75 | 120 |

The elongation at break and tearing characteristics of the composition are given in Table 10.

TABLE 10

| Film | Test direction | Elongation at break (%) | Tear resistance (N/mm) |
| --- | --- | --- | --- |
| Film 8 | MD | 119 | — |
|  | TD | 369 | 19 |
| Film 9 | MD | 361 | — |
|  | TD | 274 | 100 |
| Film 10 | MD | 259 | — |
|  | TD | 347 | 71 |

The elastic modulus and maximum stress characteristics of the films are given in Table 11.

TABLE 11

| Film | Test direction | Elastic modulus (MPa) | Maximum stress (MPa) |
|---|---|---|---|
| Film 8 | MD | 730 | 39 |
|  | TD | 180 | 35 |
| Film 9 | MD | 378 | 44 |
|  | TD | 218 | 22 |
| Film 10 | MD | 425 | 34 |
|  | TD | 248 | 27 |

Films 9 and 10 according to the invention meet all the properties of the specifications defined by the inventors in Example 1 part C), unlike film 8.

Example 3—Comparison Using Another Plasticizer

A composition 11 based on dibutyl sebacate (DBS) produced using the same compounding and extrusion-blow molding processes as Example 1 was produced for comparison. Composition 9 comprises 29% PLA, 67% PBAT, 3% DBS and 1% Joncryl® ADR 4468C.

The film 11 corresponding to composition 11 was characterized under the same conditions as the films in Example 1 part D).

Its elongation at break and tearing characteristics are given in Table 12.

TABLE 12

| Film | Test direction | Elongation at break (%) | Tear resistance (N/mm) |
|---|---|---|---|
| Film 11 | MD | 160 | — |
|  | TD | 190 | 37.5 |

In contrast to the plasticizer selected for the composition according to the invention, the use of a usual plasticizer such as DBS does not meet all the specifications defined by the inventors and adapted to the bagging market, the elongation at break in the transverse direction being less than the required 240% and its breaking strength being less than the required 40 N/mm.

Example 4

A) Production of the Compositions

The granules were produced on a twin-screw co-rotating Clextral Evolum 25 HT. To introduce the polymers (PLA and PBAT) and the compatibilizer, two gravimetric dosing devices were used and to dose the liquid TBAC, a PCM pump was used.

The PLA and Joncryl® mixture was introduced via a dosing device at the beginning of the screw in the presence of the plasticizer TBAC. The mixture is melted and fed into the PBAT introduction zone.

The granules were prepared with an auger speed of 450 rpm and a throughput of 40 kg/h.

The parameters used for the extrusion of the granules are shown in Table 13.

TABLE 13

| | Zone | | | | | | | | | | |
|---|---|---|---|---|---|---|---|---|---|---|---|
| | Z1 | Z2 | Z3 | Z4 | Z5 | Z6 | Z7 | Z8 | Z9 | Z10 | Z11 |
| Temperature | 50 | 195 | 195 | 195 | 195 | 195 | 200 | 200 | 200 | 200 | 200 |

The mixture of the components arrives in the melted state in the Z11 screw and is immediately granulated with an underwater cutting system to obtain half-moon granules with a diameter of less than 3 mm.

Three compositions are prepared, a composition 12 according to the invention comprising 35% PLA, 61.1% PBAT, 3.5% TBAC and 0.4% Joncryl® ADR 4468, a composition 13 according to the invention comprising 35% PLA, 62.1% PBAT, 2.5% TBAC and 0.4% Joncryl® ADR 4468, and a composition 14 according to the invention comprising 35% PLA, 59.6% PBAT, 2.5% TBAC 2.5% CaCO3 and 0.4% Joncryl® ADR 4468 (% by weight in relation to the total weight of the composition).

B) Production of the Film with the Compositions Described in A)

The granules prepared as described in A) were used for extrusion-blow molding with the same process and parameters described in Example 1 part B). The film 12 of composition 12 has an average thickness of 13.7 µm. The films 13 and 14 of composition 13 and 14 have an average thickness of 15 µm. The thicknesses were measured with a micrometer.

C) Characterization of the Mechanical Properties in Single Tension and in Tearing The films were then characterized mechanically in single tension and in tearing using a Lloyd LS5 testing machine equipped with a 20 N sensor and using standards EN ISO 527-3 and EN ISO 6383-1, respectively. The experimental conditions per test type are summarized in Table 9 of Example 2.

A "pants" type test tube is used for the tear test.

The elongation at break and tearing characteristics of the composition are given in Table 17.

TABLE 17

| Film | Test direction | Elongation at break (%) | Tear resistance (N/mm) |
|---|---|---|---|
| Film 12 | MD | 205 | — |
|  | TD | 350 | 50.6 |
| Film 13 | MD | 219 | — |
|  | TD | 224 | 48 |
| Film 14 | MD | 181 | — |
|  | TD | 220 | 47.6 |

The elastic modulus and maximum stress characteristics of the films are given in Table 14.

TABLE 14

| Film | Test direction | Elastic modulus (MPa) | Maximum stress (MPa) |
|---|---|---|---|
| Film 12 | MD | 678 | 39 |
|  | TD | 299 | 35 |
| Film 13 | MD | 711 | 35.5 |
|  | TD | 327 | 20.5 |
| Film 14 | MD | 685 | 31 |
|  | TD | 349 | 18 |

Films 12, 13 and 14 according to the invention meet all the properties of the specifications defined by the inventors. The addition of CaCO3 slightly reduces the mechanical properties (elongation at break longitudinally and stress at break in both directions) while remaining within the specifications.

Example 5

A) Production of the Composition

The granules were produced on a twin-screw co-rotating Clextral Evolum 25 HT. To introduce the polymers (PLA and PBAT) and the compatibilizer, two gravimetric dosing devices were used and to dose the liquid TBAC, a PCM pump was used.

The PLA and Joncryl® mixture was introduced via a dosing device at the beginning of the screw in the presence of the plasticizer TBAC. The mixture is melted and fed into the PBAT introduction zone.

The granules were prepared with an auger speed of 450 rpm and a throughput of 40 kg/h.

The parameters used for the extrusion of the granules are shown in Table 15.

TABLE 15

| | Zone | | | | | | | | | | |
|---|---|---|---|---|---|---|---|---|---|---|---|
| | Z1 | Z2 | Z3 | Z4 | Z5 | Z6 | Z7 | Z8 | Z9 | Z10 | Z11 |
| Temperature | 50 | 195 | 195 | 195 | 195 | 195 | 200 | 200 | 200 | 200 | 200 |

The mixture of the components arrives in the melted state in the Z11 screw and is immediately granulated with an underwater cutting system to obtain half-moon granules with a diameter of less than 3 mm.

A composition 15 according to the invention is prepared comprising 35% PLA, 62.1% PBAT, 2.5% TBAC and 0.4% Joncryl® ADR 4468.

B) Production of the Film with the Composition Described in A)

Granules prepared as described in A) were used for film extrusion-calendering. For extrusion-calendering, a FAIREX extruder with a diameter of 45 mm, a flat die of 220 mm and adjustable lips fixed at 0.6 mm opening were used as well as a three-cylinder calender. Before extrusion, the composition was dried 4 h at 80° C. in a desiccator.

The extrusion and calendering settings are detailed in Table 26.

TABLE 16

| | |
|---|---|
| Setpoint temperatures of the extrusion zones, from Z1 to Z4 (° C.) | 140 – 160 – 170 – 170 |
| Screw rotation speed (rpm) | 5 |
| Pressure (bar) | 10 |
| Die temperature (° C.) | 170 |
| Lip opening (mm) | 0.6 |
| Cylinder temperature (° C.) | 10 |
| Throughput (kg/h) | 7.6 |

The calendered film 15 of composition 15 has an average thickness of 30 μm. The thicknesses were measured with a micrometer.

C) Characterization of the Mechanical Properties in Single Tension and in Tearing The film was then mechanically characterized in single tension and in tearing using a Lloyd LS5 testing machine equipped with a 5 kN sensor and using standards EN ISO 527-3 and EN ISO 6383-1, respectively. The experimental conditions per test type are summarized in Table 9 of Example 2.

A "pants" type test tube is used for the tear test.

The elongation at break and tearing characteristics of the composition are given in Table 17.

TABLE 17

| Film | Test direction | Elongation at break (%) | Tear resistance (N/mm) |
|---|---|---|---|
| Film 15 | MD | 199.9 | 11.4 |
| | TD | 232.6 | 79.1 |

The elastic modulus and maximum stress characteristics of the film are given in Table 18.

TABLE 22

| Film | Test direction | Elastic modulus (MPa) | Maximum stress (MPa) |
|---|---|---|---|
| Film 15 | MD | 905.5 | 27.3 |
| | TD | 341.3 | 13.2 |

The inventors have established a set of specifications to be achieved allowing the sale of the film of the invention in the packaging market, namely that it is desirable that the film of the invention reaches the following values:

Elongation at break, which measures the ability of a material to elongate under load before breaking: 10% longitudinally and measured according to standard EN ISO 527-3.

Tear resistance: 8 N/mm longitudinally and measured according to the conditions of standard DIN EN ISO 6383 at 200 mm/min or under the conditions as described in this example.

Elastic modulus: 400 MPa longitudinally

Maximum stress: 11 MPa longitudinally

The film 15 according to the invention meets all the properties of the specifications defined by the inventors. This film has even more favorable properties, in particular and above all in terms of elongation.

REFERENCES

Dong & al., International Journal of Molecular Sciences, 2013, 14, 20189-20203

Ojijo & al., Polymer 2015, 80, 1-17

CN 106881929

EP 1 699 872; EP 2 258 775; EP 2 679 633

U.S. Pat. Nos. 6,841,597, 5,436,078, 9,096,758, 7,448,510, US 2012/232191, U.S. Pat. No. 7,368,503

WO 2002/059202, WO 2002/059199, WO 2007/118828, WO 2002/059198, WO 2004/052646; WO 2013/164743; WO 2015/057694; WO 2019/043145 WO 2013/093355, WO 2016/198652, WO 2016/198650, WO 2016/146540, WO 2016/062695, WO 2019/043134

The invention claimed is:

1. A plastic composition comprising:
   a) at least 20% by weight polylactic acid (PLA),
   b) at least 45% by weight of a polyester selected from polybutylene adipate terephthalate (PBAT), polyhydroxyalkanoates (PHAs), polybutylene succinate (PBS), polybutylene succinate adipate (PB SA) and mixtures thereof,
   c) a PLA/polyester compatibilizer, and
   d) from 1% to 5% by weight of a plasticizer selected from citrate esters,
   wherein the compatibilizer is poly(ethylene-co-methyl acrylate-co-glycidyl methacrylate), and
   wherein the citrate esters are selected from triethyl citrate (TEC), triethyl acetyl citrate (TEAC), tributyl citrate (TBC), and tributyl acetyl citrate (TBAC), and wherein citrate esters are sole plasticizer.

2. The plastic composition according to claim 1, wherein the polyester b) is PBAT.

3. The plastic composition according to claim 1, wherein the citrate ester is TBAC.

4. The plastic composition according to claim 1, wherein the composition comprises at least 25% PLA.

5. The plastic composition according to claim 1, wherein the polyester b) content is at least 50% of the total weight of the composition.

6. The plastic composition according to claim 1, wherein the poly(ethylene-co-methyl acrylate-co-glycidyl methacrylate) compatibilizer c) content is between 0.4 and 2% by weight in relation to the total weight of the composition.

7. The plastic composition according to claim 1, further comprising polyester-degrading enzymes.

8. The plastic composition according to claim 7, wherein the composition further comprises from 0.0005 to 10% enzymes.

9. A plastic film, wherein said plastic film comprises at least one layer of the plastic composition as defined in claim 1.

10. The plastic film according to claim 9, wherein said film is a single layer film.

11. A process for the preparation of the plastic composition as defined in claim 1, the process comprising the steps of:
    mixing the PLA a) and the compatibilizer c) at a temperature where the PLA is partially or completely melted, and
    adding the polyester b) selected from polybutylene adipate terephthalate (PBAT), polyhydroxyalkanoates (PHAs), polybutylene succinate (PBS), polybutylene succinate adipate (PBSA) and mixtures thereof at a temperature where the previously obtained mixture is partially or completely melted,
    wherein the plasticizer d) is selected from citrate esters added at any time during the process.

12. The plastic film according to claim 9, wherein said plastic film further comprises polyester degrading enzymes.

13. The process according to claim 11, wherein the step of mixing the PLA a) and the compatibilizer c) further comprises at least 25% by weight PLA and between 0.4 and 1.5% by weight compatibilizer, in relation to the total weight of the composition.

14. The process according to claim 11, wherein the step 2) comprises at least 60% of the polyester.

15. The process according to claim 11, wherein the plasticizer content is comprised between 2 to 4% by weight.

16. The process according to claim 11, wherein the preparation of the composition is done by extrusion.

* * * * *